(12) United States Patent
Stanis et al.

(10) Patent No.: US 10,974,970 B2
(45) Date of Patent: Apr. 13, 2021

(54) SYSTEM AND METHOD TO SYNTHESIZE AMMONIA

(71) Applicant: Gas Technology Institute, Des Plaines, IL (US)

(72) Inventors: Ronald J. Stanis, Des Plaines, IL (US); Jeffrey A. Mays, Woodland Hills, CA (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 641 days.

(21) Appl. No.: 15/876,259

(22) Filed: Jan. 22, 2018

(65) Prior Publication Data

US 2018/0208475 A1 Jul. 26, 2018

Related U.S. Application Data

(60) Provisional application No. 62/448,437, filed on Jan. 20, 2017.

(51) Int. Cl.
*C01C 1/04* (2006.01)

(52) U.S. Cl.
CPC .......... *C01C 1/0429* (2013.01); *C01C 1/0458* (2013.01); *C01C 1/0476* (2013.01); *Y02P 20/52* (2015.11)

(58) Field of Classification Search
CPC .... C01C 1/0429; C01C 1/0458; C01C 1/0476
See application file for complete search history.

(56) References Cited

U.S. PATENT DOCUMENTS

| | | | |
|---|---|---|---|
| 5,494,811 A * | 2/1996 | Scott | B01J 8/32 422/140 |
| 5,711,926 A | 1/1998 | Knaebel | |
| 8,105,541 B2 | 1/2012 | Stewart et al. | |
| 2010/0092381 A1 * | 4/2010 | Stewart | B01D 53/86 423/648.1 |
| 2015/0125377 A1 * | 5/2015 | Himstedt | C01C 1/006 423/359 |

FOREIGN PATENT DOCUMENTS

| | | | | |
|---|---|---|---|---|
| CN | 101618305 A | * | 1/2010 | ............ C01C 1/006 |
| CN | 101618305 A | | 1/2010 | |

OTHER PUBLICATIONS

PCT International Search Report, Form PCT/ISA/210, dated Mar. 26, 2018, (2 pages).
PCT Written Opinion of the International Searching Authority, Form PCT/ISA/237, dated Mar. 26, 2018, (11 pages).
"Fluidized Bed Reactor" From Wikipedia, the free enclyclopedia, https://en.wikipedia.org/wiki/Fluidized_bed_reactor, 4 pages.
"Ammonia Synthesis Enhanced by Magnesium Chloride Absorption" Himstedt, Heath H., et al., AIChE Journal 61.4 (2015), pp. 1364-1371.
"Sorption of Ammonia in Cation-Exchanged Y Zeolites: Isotherms and State of Sorbed Molecules" Shiralkar et al., Journal of Colloid and Interface Science, vol. 108, pp. 1-10 (1985).

* cited by examiner

*Primary Examiner* — Yong L Chu
(74) *Attorney, Agent, or Firm* — Pauley Erickson & Swanson (57) ABSTRACT

A system and method for producing ammonia at high conversion rates. The system having a fluidized bed reactor with a fluidized zone with catalyst particles. The fluidized bed reactor is preferably configured to receive a continuous flow of solid sorbent particles, nitrogen, and hydrogen, with the catalyst particles being at least ten times larger than the sorbent particles. The method allows for the nitrogen and hydrogen react on a surface of the catalyst in order to generate ammonia that is adsorbed by the sorbent particles. The method extracts the adsorbed ammonia from the sorbent particles with a sorbent regenerator to product a pure ammonia product.

27 Claims, 5 Drawing Sheets

SYSTEM AND METHOD TO SYNTHESIZE AMMONIA

CROSS REFERENCE TO RELATED APPLICATION

This application claims the benefit of U.S. Provisional Patent Application Ser. No. 62/448,437, filed on 20 Jan. 2017. The Provisional Patent Application is hereby incorporated by reference herein in its entirety and is made a part hereof, including but not limited to those portions which specifically appear hereinafter.

BACKGROUND OF THE INVENTION

Field of the Invention

This invention relates generally to a system and method for synthesizing ammonia with a fluidized bed reactor with a fluidized zone having sorbent particles and catalyst particles.

Discussion of Related Art

Known methods for producing ammonia from hydrogen and nitrogen include the Haber-Bosch method. These known methods are limited by equilibrium and produce conversion rates of only about 20%. To address this problem, methods using Haber-Bosch reactors require high amounts of unreacted gases leaving the reactor to be recycled to the reactor inlet after the product ammonia is separated by condensation. This high recycle rate contributes to high operating costs.

Known Haber-Bosch reactors also operate at generally high pressure and temperature, around 2,000 to 4,400 psig and about 550° C. Output from the Haber-Bosch reactors is sent to a chiller to chill the reactor exhaust gases to a range of 30-200° C. to condense ammonia product as a liquid. Unreacted hydrogen, nitrogen and vapor phase ammonia are then recycled back to a reactor inlet. Operating costs, due to refrigeration, the high rate of recycling and recompression, and reheating are significant.

A known process for making ammonia is described in U.S. Patent Application Publication No. 2015/0125377. The method uses a reactor having a catalyst and sorbent to adsorb an ammonia gas product. The application states that the sorbent can be regenerated by increased temperature or decreased pressure. However, this method is not practical as it requires stopping of a flow of feed gases to the reactor, then decreasing pressure or increasing temperature of the entire vessel containing both the catalyst and the sorbent. This method requires the reactor to be thermally or pressure cycled in batches. A similar process is described in "Ammonia synthesis enhanced by magnesium chloride absorption" Himstedt, Heath H., et al. AIChE Journal 61.4 (2015), pages 1364-1371.

Another process for synthesizing ammonia is described in U.S. Pat. No. 5,711,926. This patent describes a process that uses a Haber-Bosch ammonia synthesis reactor followed by a separate adsorption vessel to adsorb the product ammonia. The separate device is described as a pressure swing adsorption (PSA) device independent of the reactor. Similar to the '377 Publication, the PSA device does not allow for continuous operation and each PSA must have the flow stopped, and be thermally or pressure cycled in order to recover the adsorbed ammonia. An example of the sorbent used in this process is an H-Y zeolite. The H-Y zeolite sorbent is also described by Shiralkar and Kulkarni in the Journal of Colloid and Interface Science, volume 108, pages 1-10 (1995).

Another known process is described in U.S. Pat. No. 8,105,541. This patent describes a reactor system for synthesizing hydrogen from a product stream including steam and natural gas. The system of this patent operates at a low pressure of about 50 psig.

As such, there is a need for a new system that minimizes recycle flowrates and provides higher conversion rates. There is also a need for a system that separates a product ammonia gas from hydrogen and nitrogen via a sorbent, eliminating a need for a chiller for separation by condensation.

SUMMARY OF THE INVENTION

The present disclosure describes a system and method for producing ammonia at high conversion rates. Unlike the traditional Haber-Bosch ammonia process, which have only a 20% conversion rate, the system and method of this invention provides conversion rates ranging from 70% to 95%, with a preferred conversion rate of 90%. The system and method of this invention uses Le Chatelier's principle and adsorbs ammonia product as it is produced in the reactor. With this method and system, regeneration and release of pure ammonia is achieved at pressures significantly lower than traditional Haber-Bosch processes with additional benefits including, a reduced need for a chiller, minimized recycling and lower operating costs. More specifically, a main ammonia product stream will come off a regenerator without requiring a chiller. However, an ammonia product in a recycle gas and a lock hopper off gas may require refrigeration. Additionally, if the plant requires a liquid ammonia product, then a chiller will still be required to condense the product, but only the product will be chilled, not unreacted hydrogen and nitrogen.

In an embodiment of this invention, the system includes a fluidized bed reactor with a fluidized zone with catalyst particles. The fluidized bed reactor is preferably configured to receive solid sorbent particles in a flow of nitrogen ($N_2$) and hydrogen ($H_2$). The fluidized bed reactor may also receive a carrier gas, such as deoxygenated natural gas, to assist with fluidization. The system is preferably designed to operate with a continuous flow to the reactor and not in batches as required by previously known systems. In a preferred embodiment, the nitrogen and hydrogen react on a surface of catalyst particles generating ammonia, and at least a portion of the generated ammonia is adsorbed by the sorbent particles. In an embodiment of this invention, the catalyst particles are ten times larger than the solid sorbent particles. In another embodiment, the catalyst particles may be up to 100 times larger than the solid sorbent particles. However, in preferred embodiments, the catalyst particles range from 14 to 20 times larger than the solid sorbent particles. These ratios allow the lighter sorbent particles and adsorbed ammonia to elutriate out of the reactor while the larger catalyst particles to remain trapped in the reactor. In an embodiment of this invention, the fluidized bed reactor comprises a generally cylindrical shape with a height to diameter ratio of approximately ten to one. In a more preferred embodiment, the height to diameter ratio of the fluidized bed reactor is approximately twenty to one. In a most preferred embodiment, the height to diameter ratio of the fluidized bed reactor is twenty-six to one. The height to diameter ratio provides for sufficient residence time for generating ammonia and for the generated ammonia to be adsorbed by the sorbent while also preventing the larger catalyst particles from escaping out of the top of the fluidized bed reactor. In alternative embodiments, the fluidized bed reactor may not include a cylindrical shape and may include a tapered or conical shape that narrows near the top of the reactor. In operation, the sorbent particles are carried upward through the reactor due to a high velocity of the gases. For a given volumetric flow rate of gas, a narrow diameter will result in a higher linear velocity compared to a wide diameter vessel which will have relatively lower linear velocity. In the reactor, as the $H_2$ and $N_2$ react to become $NH_3$, the volumetric flow rate slows towards the top of the reactor because the amount of gas decreases due to the reaction. In some embodiments of this invention, to compensate for reduction in the amount of gas, the fluidized bed reactor may include a reduction in the diameter near the top of the reactor to maintain a high gas velocity.

The system may further include at least one of a cyclone or a filter to separate the solid sorbent particles with the adsorbed ammonia from the unreacted and unabsorbed gases. The system of this invention may further include a sorbent regenerator to release an adsorbed ammonia from the solid sorbent particles by either decreasing pressure or increasing temperature. The system of this invention may further include at least one of a temperature control system for controlling a temperature of the reactor and a pressure control system for controlling a pressure of the reactor. The system of this invention may further include a recycle line to recycle at least one of an unreacted nitrogen, an unreacted hydrogen, and an unabsorbed ammonia to the reactor.

The system of this invention minimizes a recycle flowrate and provides higher conversion rates. In a preferred embodiment of this invention, the product ammonia gas is separated from the hydrogen and nitrogen by a sorbent, eliminating the need for a chiller for separation by condensation.

Other objects and advantages will be apparent to those skilled in the art from the following detailed description taken in conjunction with the claims and drawings.

BRIEF DESCRIPTION OF THE DRAWINGS

Objects and features of this invention will be better understood from the following description taken in conjunction with the drawing, wherein.

DETAILED DESCRIPTION OF THE INVENTION

Figure 1:
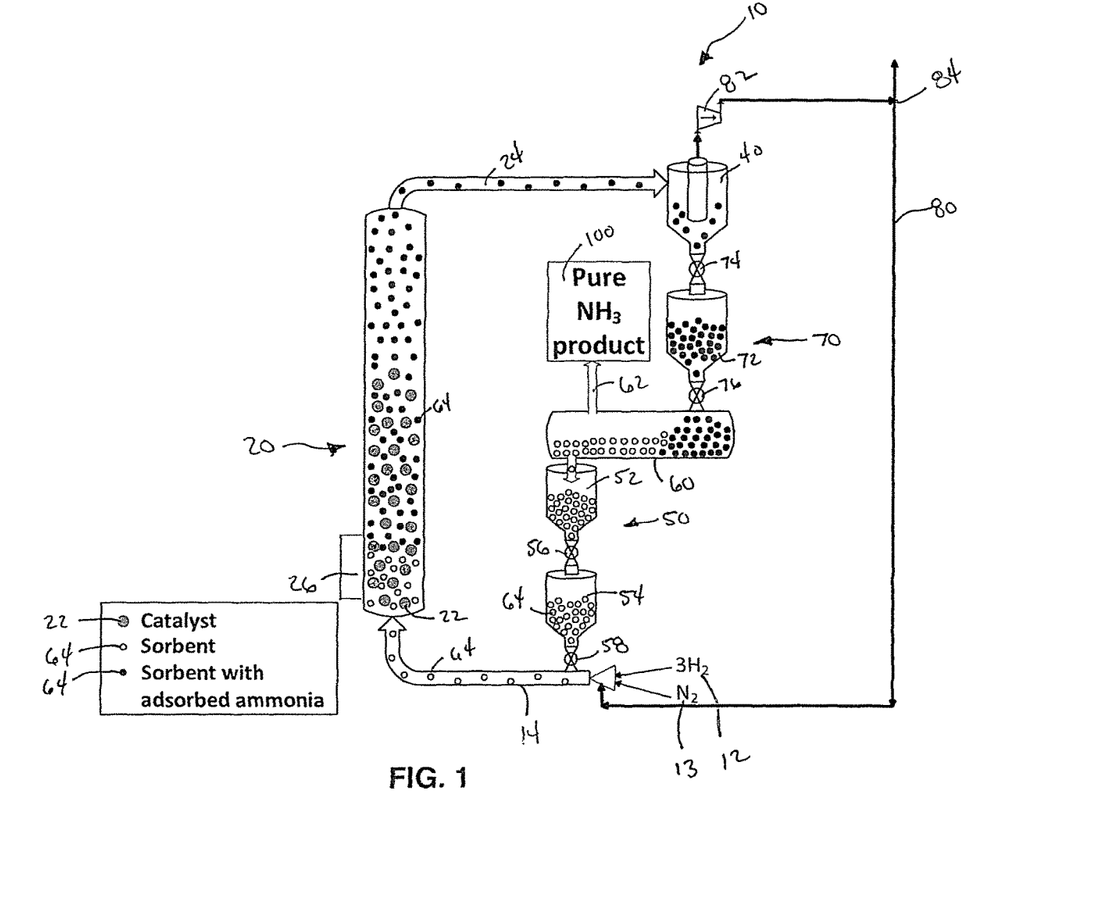
FIG. 1 is a simplified schematic diagram of a system for ammonia synthesis according to an embodiment of this invention.

The subject development provides a system 10 and method of synthesizing ammonia from hydrogen and nitrogen at high conversion rates. FIG. 1 shows a schematic diagram of an embodiment of the system 10 for sorbent enhanced Haber-Bosch process for ammonia synthesis. The following description is directed to the synthesis of ammonia, however, it should be understood, that a person of skill in the art would know how to change the reactants, catalyst and other chemicals and elements in order to synthesize other products.

As shown in FIG. 1, the system 10 of this invention preferably comprises a cycle which includes a fluidized bed reactor 20 connected to a cyclone 40 and the cyclone 40 connected to a sorbent regenerator 60 which connects back to the fluidized bed reactor 20. The system 10 of FIG. 1 further includes a recycle line 80 however, the system 10 of this invention does not required the recycle line 80. The sorbent regenerator 60 of this embodiment further includes a sorbent regenerator output 62 for outputting a pure ammonia product 100.

In the embodiment shown in FIG. 1, reactants 12, 13 are provided to a bottom of the fluidized bed reactor 20 via an input line 14. In this embodiment, the reactants 12, 13 include hydrogen ($H_2$) 12 and nitrogen ($N_2$) 13. In alternative embodiment of this invention, other reactants 12, 13 may be used to synthesize other products. As shown in FIG. 1, solid sorbent particles 64 are also provided to the input line 14 from the sorbent regenerator 60. In this embodiment, the solid sorbent particles 64 are provided to the input line 14 via a regenerated sorbent lock hopper system 50 including a pair of hoppers 52, 54 and a pair of valves 56, 58. The valves 56, 58 may comprise a ball valve, a slide valve, a rotary and/or some other type of valve. The regenerated sorbent lock hopper system 50 may preferably be purged with nitrogen gas ($N_2$) and in pressure vessels. Alternatively, when a pressure change is under a certain percentage of operating pressure, for instance 1%, the lock hopper system 50 may be replaced with one or more of a rotary valve, a J-valve, an L-valve, a ball valve, a slide valve, a standpipe, and/or a screw auger.

In a preferred embodiment, the solid sorbent particles 64 comprise at least one of magnesium chloride ($MgCl_2$), magnesium bromide ($MgBr_2$), and/or calcium chloride ($CaCl_2$). However, in alternative embodiments, the solid sorbent particles 64 may comprise other compounds including, for example, but not limited to, $MgI_2$, $CaBr_2$, $CaClBr$, $SrCl_2$, $SrBr_2$, $BaCl_2$, $ZnCl_2$, and $MnCl_2$, and/or other certain zeolites.

As shown in FIG. 1, an entrained flow of the solid sorbent particles 64, hydrogen gas 12 and nitrogen gas 13 flow into the fluidized bed reactor 20 with catalyst particles 22. The catalyst particles 22 may comprise commercially available iron (Fe) based catalytic material, however other catalysts may be used. In an embodiment of this invention, the catalyst particles 22 include a mean diameter ranging from 1.0 mm to 6.0 mm. In a preferred embodiment, the catalyst particles comprise a mean diameter of 2.0 mm. However, it should be understood that the provided diameters are exemplary and that other diameters may be used.

In an embodiment of this invention, the solid sorbent particles 64 comprise a mean diameter ranging from 0.01 mm to 0.6 mm and more preferably ranging from 0.1 mm to 0.6 mm. In a preferred embodiment, the solid sorbent particles 64 comprise a mean diameter of 0.2 mm. However, it should be understood that the provided diameters are exemplary and that other diameters may be used.

In an embodiment of this invention, the mean diameter of the catalyst particles 22 are up to 100 times larger than the mean diameter of the solid sorbent particles 64. Preferably, the mean diameter of the catalyst particles 22 is 10 times larger than the mean diameter of the solid sorbent particles 64. More preferably, the mean diameter of the catalyst particles 22 is 14 times larger than the mean diameter of the solid sorbent particles 64. Most preferably, the mean diameter of the catalyst particles 22 is 20 times larger than the mean diameter of the solid sorbent particles 64.

According to one embodiment of this invention, the fluidized bed reactor 20 may comprise the reactor taught by U.S. Pat. No. 8,105,541. However, it should be understood that other types of reactor systems may be used. In an embodiment of this invention, the fluidized bed reactor 20 includes a plenum section having a distributor plate and injectors for injecting the reactants and sorbent into a reaction zone where the following reactions occurs:

However, it should be understood that the synthesis of other products will require other reactions. In a preferred embodiment, the system 10 also includes injectors for a carrier gas to enable fluidization of the reactants 12, 13, the sorbents 64, and catalyst particles 22. Preferably, the carrier gas that does not include oxides or water. In an embodiment of this invention, the carrier gas may comprise, for example, a synthesis gas or deoxygenated natural gas.

In an embodiment of this invention, the reactor 20 operates at a pressure ranging from about 300 psig to 4,000 psig and a temperature ranging from about 200° C. to 500° C. More preferably, the reactor 20 operates at a pressure ranging from about 900 psig to 1,100 psig and a temperature ranging from about 200° C. to 500° C. Most preferably, the reactor 20 operates at a pressure of about 1,000 psig and a temperature of about 350° C. In a preferred embodiment, the system of this invention may further include at least one of a temperature control system for controlling a temperature of the fluidized bed reactor 20 and a pressure control system for controlling a pressure of the fluidized bed reactor 20.

Figure 2:
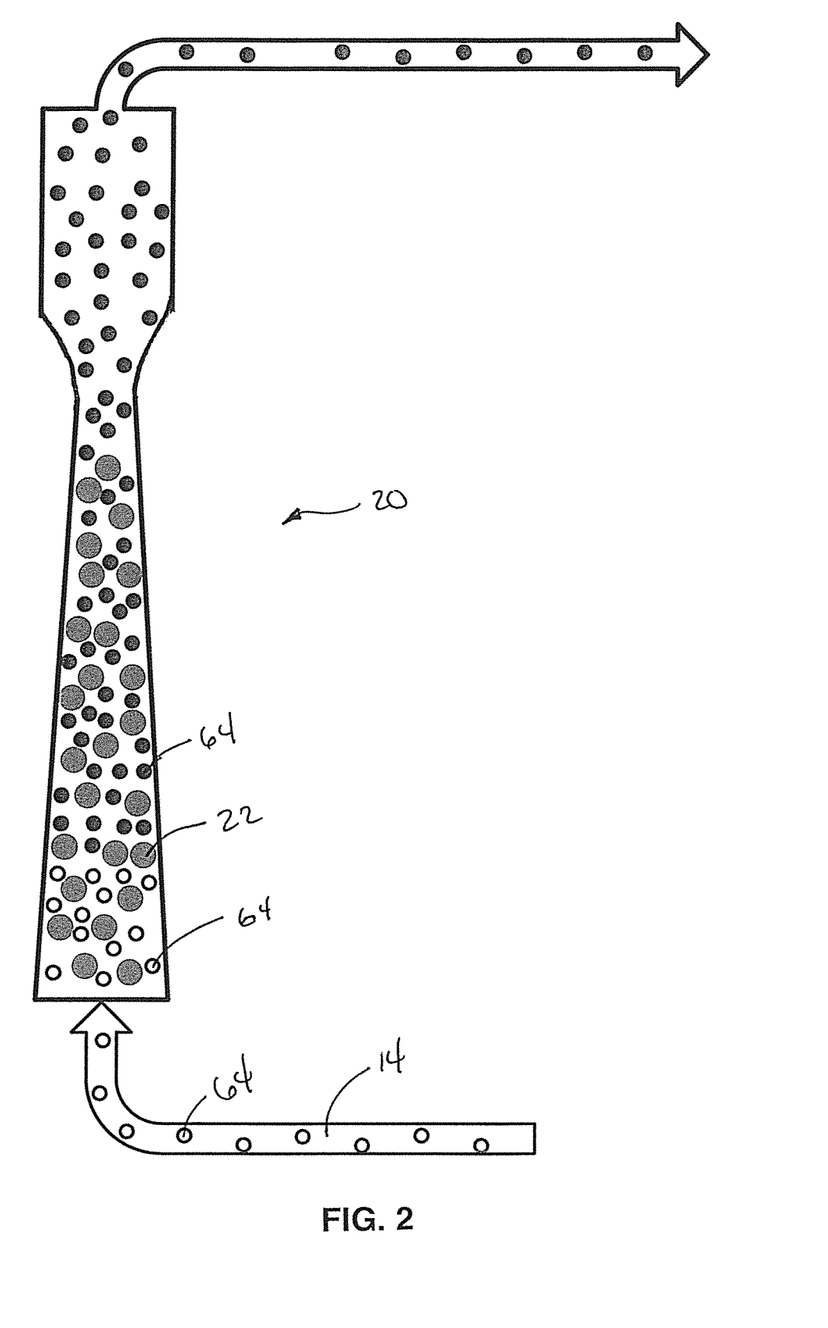
FIG. 2 is a simplified schematic diagram of an alternative embodiment of a fluidized bed reactor for use in the synthesis of ammonia.

As the hydrogen 12 and nitrogen 13 react on the catalyst 22 surface, at least a portion of a generated ammonia is adsorbed by the sorbent 64. A flowrate of gas entering the reactor 20 is preferably controlled to fluidize the catalyst 22 and the sorbent 64 sufficiently such that the lighter sorbent particles 64 are elutriated out of the top of the reactor with unreacted hydrogen, unreacted nitrogen and unadsorbed ammonia, while the larger and heavier catalyst particles 22 remain in the fluidized bed reactor 20. In a preferred embodiment, the fluidized bed reactor 20 is designed to provide a sufficient residence time for generating ammonia and for the generated ammonia to be adsorbed by the sorbent 64. In an embodiment of this invention, the fluidized bed reactor 20 comprises a cylindrical shape with a height to diameter ratio of approximately ten to one. In a more preferred embodiment, the height to diameter ratio of the fluidized bed reactor 20 is approximately twenty to one. In a most preferred embodiment, the height to diameter ratio of the fluidized bed reactor 20 is twenty-six to one. In an alternative embodiment, the fluidized bed reactor 20 may not include a cylindrical shape. For example as shown in the embodiment of FIG. 2, the fluidized bed reactor 20 may comprise a generally hourglass shape with a relatively wide base tapering to a narrow section in an upper half of the fluidized bed reactor 20 before expanding back to a diameter equal to the diameter of the base. This design of the fluidized bed reactor 20 maintains of a velocity of the sorbent particles 64 as they pass through the fluidized bed reactor and to provide sufficient residence time for generating ammonia and for the generated ammonia to be adsorbed by the sorbent 64 while also preventing the larger catalyst particles 22 from escaping out of the top of the fluidized bed reactor 20. It should be noted that the embodiment shown in FIG. 2 is merely exemplary and that the design may vary. Preferably, the narrow section provides a smooth and gradual transition that does not include ledges or hard transitions that may trap particles and cause an accumulation.

In a preferred embodiment of this invention, the fluidized bed reactor 20 further includes a heat exchanger 26 for removing heat from the fluidized bed reactor 20. Alternatively, the heat exchanger 20 may include a cooled wall or another device for removing heat from the fluidized bed reactor 20.

The sorbent particles 64 including adsorbed ammonia then elutriates out of the fluidized bed reactor 20 to a reactor output 24 to the cyclone 40. In addition to the sorbent particles 64 with the adsorbed ammonia, unreacted hydrogen, unreacted nitrogen, unadsorbed ammonia, and/or the carrier gas may also pass into the reactor output 24 to the cyclone 40. While the catalyst particles 22 preferably remain in the fluidized bed reactor 20. In an embodiment of the invention, the cyclone 40 separates the sorbent particles 64 from the gases including the unreacted hydrogen, the unreacted nitrogen, the unadsorbed ammonia, and the carrier gas. In an alternative embodiment, the cyclone 40 may be replaced with a filter or another device for separating the sorbent particles 64 from the unreacted hydrogen, the unreacted nitrogen, the unadsorbed ammonia, and/or the carrier gas.

Figure 3:
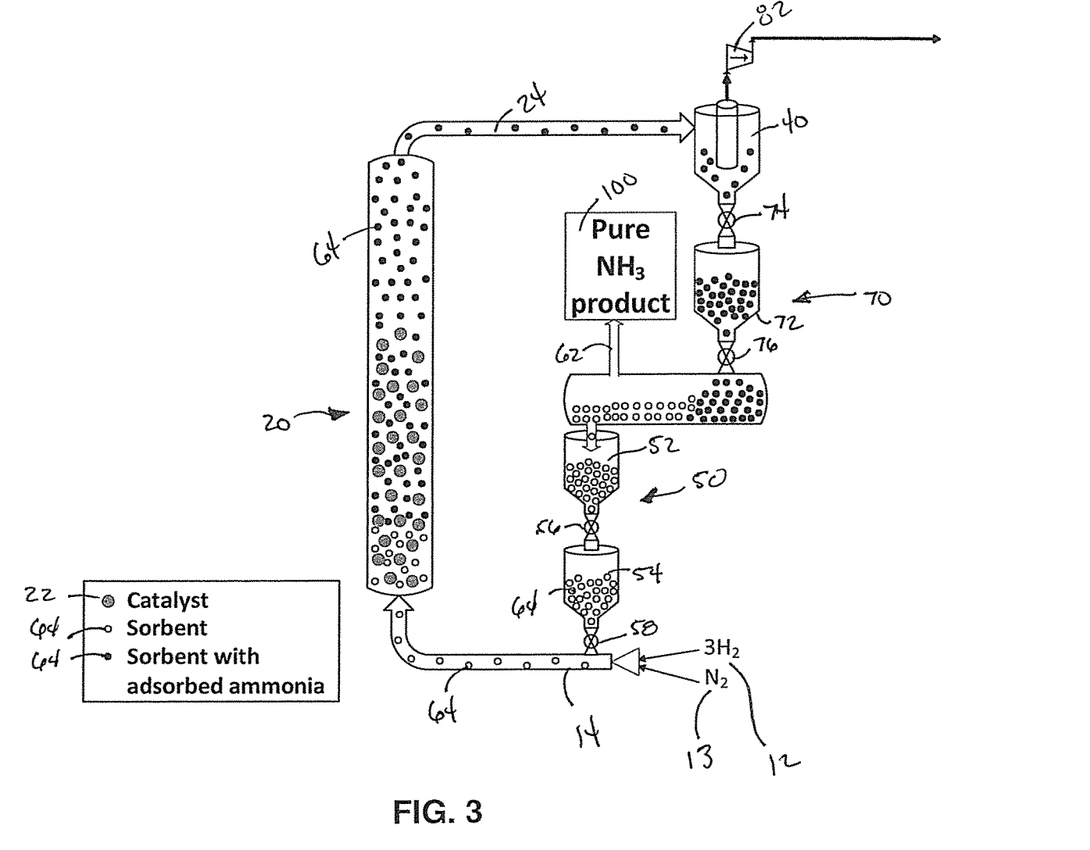
FIG. 3 is a simplified schematic diagram of another embodiment of the system for ammonia synthesis without a recycle line.

In the embodiment shown in FIG. 1, the unreacted hydrogen, the unreacted nitrogen and the unadsorbed ammonia then pass from the cyclone 40 through a pump 82 to a recycle line 80. The recycle line 80 further includes a divider 84 that sends a portion of the gases back to the input line 14 and the fluidized bed reactor 20 and another portion is diverted for another use, such as allowing the carrier gas to be used as a fuel. In another embodiment shown in FIG. 3, the unreacted hydrogen, the unreacted nitrogen and the unadsorbed ammonia are not recycled to the input line and may be instead used for another purpose.

In an embodiment of this invention, the separated sorbent particles 64 with the adsorbed ammonia pass from the cyclone 40 to a regenerator lock hopper system 70. In one embodiment, the regenerator lock hopper system 70 includes a regenerator hopper 72, a first valve 74, and a second valve 76. In the embodiment of FIG. 1, the first valve 74 meters a portion of the sorbent particles 64 with the adsorbed ammonia from the cyclone 40 to the regenerator hopper 72. The second valve 74 then meters a portion of the sorbent particles 64 with the adsorbed ammonia from the regenerator hopper 72 to the sorbent regenerator 60. In embodiments of this invention, the first valve 74 and the second valve 76 may comprise any type of valve including a ball valve, a slide valve, a rotary valve, or any other type of valve. In alternative embodiments, when a pressure change is under a certain percentage of operating pressure, for instance 1%, the regenerator lock hopper system 70 may be replaced with one or more of a rotary valve, a J-valve, a ball valve, a slide valve, a standpipe, and/or a screw auger. The regenerator lock hopper system 70 or the standpipe may preferably be purged with nitrogen gas ($N_2$) and in pressure vessels.

In an embodiment, the sorbent regenerator 60 regenerates the sorbent and extracts the ammonia product ($NH_3$) at a constant temperature and a lower pressure than traditional systems. The sorbent regenerator 60 of this invention preferably comprises a screw type regenerator or a rotary kiln.

Alternatively, the sorbent regenerator 60 may comprise a transport reactor or a fluidized bed regenerator where a fluidize gas is ammonia. In an embodiment of this invention, the sorbent regenerator 60 can be horizontal or slightly tilted downward. The regenerator 60 releases the ammonia by either lowering pressure, increasing temperature or both. The ammonia is collected as the desired product and released through the sorbent regenerator output 62. The regenerated sorbent 64 is then reintroduced to the fluidized bed reactor 20 via input lock hopper system 50. In a preferred embodiment, this process is done with a continuous flow of gases and sorbent and not as a batch process.

Figure 4:
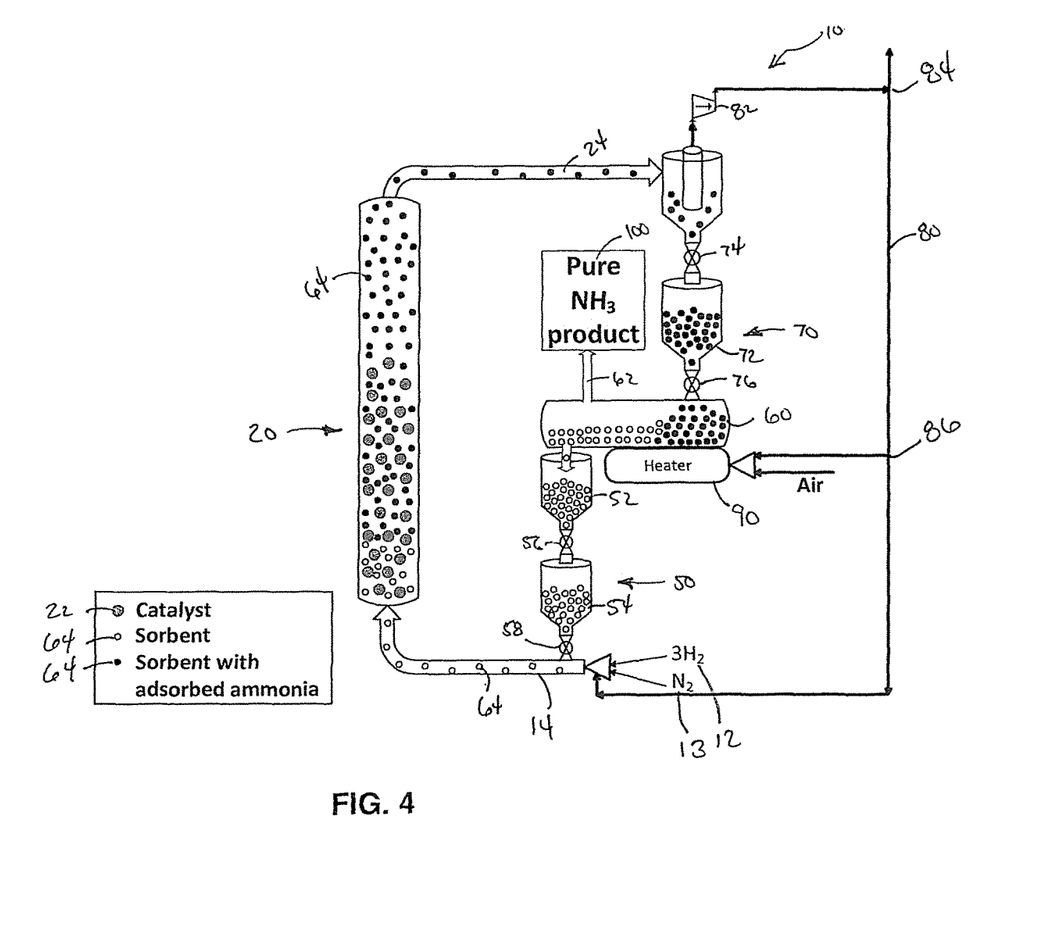
FIG. 4 is a simplified schematic diagram of another embodiment of the system for ammonia synthesis with a recycle line with a three-way splitter.

In another embodiment of this invention, the sorbent regenerator 6 may include a heater 90 to improve the regeneration process. The heater 90 may be a fired heater or a steam heater. In the embodiment of FIG. 4, the recycle line 80 includes a splitter 86 that sends a portion of the hydrogen, the nitrogen, and/or the unadsorbed ammonia along with air as a fuel for the heater 90.

Figure 5:
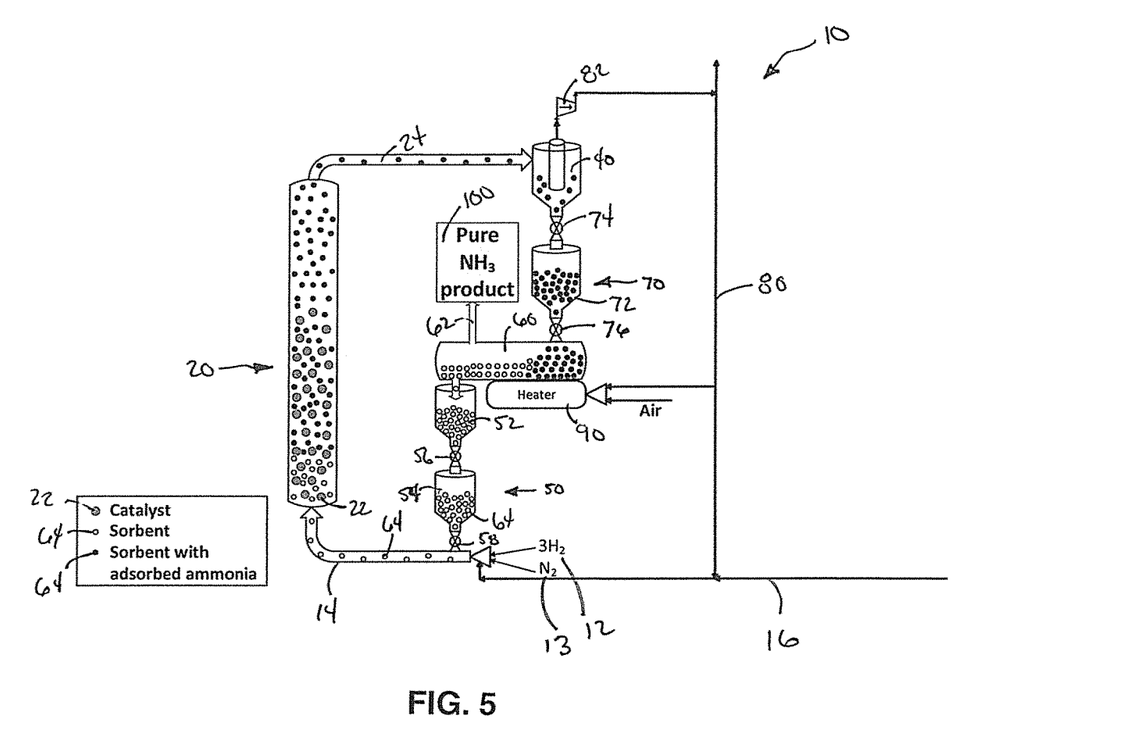
FIG. 5 is a simplified schematic diagram of another embodiment of the system for ammonia synthesis with a supplemental fluidization gas supply line.

In another embodiment of this invention as shown in FIG. 5, the reactants 12, 13 are provided the input line 14 as discussed above. In this embodiment, a supplemental fluidization line 16 provides the carrier gas to the input line 14. In a preferred embodiment, the carrier gas comprises natural gas with no oxygen containing species, such as $H_2O$, $O_2$, $CO$, and $CO_2$. In another embodiment, the carrier gas may comprise argon. However, it should be understood that other carrier gases capable of enabling fluidization of the reactants, products, sorbents, and/or catalysts may be used.

A unique feature of the invention is the ability to remove the solid sorbent 64 from the reactor 20 in a continuous manner. The phenomenon of driving reactions to higher conversion rates by adsorbing a product has been observed for over a century. When using a solid sorbent it has been traditionally difficult develop a practical system because the solids are typically imagined not to flow. As a result it is not possible to separate the catalyst and sorbent, making regeneration of the sorbent and methods to recover the product gas impractical. It is impractical because all flow must be stopped and the entire vessel, containing catalyst and sorbent must be thermally or pressure cycled. The method of this invention flows the solid particles by entraining them in a gas stream. The intentional size difference between the catalyst 22 and the sorbent 64 allows for easy separation. An advantage of the invention is the recycle rate of hydrogen and nitrogen from the outlet of the fluidized bed reactor back to the inlet of the fluidized bed reactor is minimized or eliminated. Another advantage is that the use of a chiller to condense and separate the ammonia product from the gas outlet stream is eliminated. Instead the ammonia product is separated by adsorption. However, flowing solid particles in a continuous loop is a complex process that requires careful engineering to ensure that clogs do not occur to prevent improper sealing, while accommodating increases of mechanical stresses of components.

In another embodiment of this invention, the system may further include thermal swing desorption, such as calcination. The thermal swing desorption process utilizes a drop in pressure and an increase in temperature to drive off excess ammonia.

The claims are not intended to include, and should not be interpreted to include, means-plus- or step-plus-function limitations, unless such a limitation is explicitly recited in a given claim using the phrase(s) "means for" or "step for," respectively.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of producing ammonia, the method comprising the following steps:
    flowing a stream of solid sorbent particles, hydrogen, and nitrogen into a reactor, wherein the reactor includes a fluidized bed of catalyst particles;
    generating ammonia by reacting the hydrogen and the nitrogen on a surface of the catalyst particles; and
    adsorbing the ammonia with the solid sorbent particles, wherein the catalyst particles are at least 10 times larger than the solid sorbent particles.

2. The method of claim 1, wherein the catalyst particles comprise a mean diameter ranging from 1.0 mm to 6.0 mm and the solid sorbent particles include a mean diameter ranging from 0.1 mm to 0.6 mm.

3. The method of claim 1, wherein the catalyst particles comprise a mean diameter ranging from 1.0 mm to 6.0 mm and the solid sorbent particles include a mean diameter ranging from 0.01 mm to 0.6 mm.

4. The method of claim 1, wherein the solid sorbent particles comprise at least one of $MgCl_2$, $MgBr_2$, and $CaCl_2$).

5. The method of claim 1, wherein the reactor operates at a pressure ranging from about 800 psig to 1500 psig and a temperature ranging from about 200° C. to 500° C.

6. The method of claim 1, wherein the reactor operates at a pressure ranging from about 900 psig to 1100 psig and a temperature ranging from about 200° C. to 500° C.

7. The method of claim 1, wherein a flowrate of hydrogen and nitrogen entering the reactor is controlled to fluidize the catalyst particles and the solid sorbent particles sufficiently such that lighter solid sorbent particles are elutriated out of the reactor with unreacted hydrogen, unreacted nitrogen and unadsorbed ammonia, while larger and heavier catalyst particles remain in the reactor.

8. The method of claim 7, wherein the unreacted hydrogen, the unreacted nitrogen and the unadsorbed ammonia and the solid sorbent particles are fed to one of a cyclone or a filter to separate the solid sorbent particles from the unreacted hydrogen, the unreacted nitrogen and the unadsorbed ammonia.

9. The method of claim 8, wherein the unreacted hydrogen, the unreacted nitrogen and the unadsorbed ammonia are recycled back to the reactor.

10. The method of claim 8, wherein the solid sorbent particles pass to a sorbent regenerator, wherein the sorbent regenerator releases the adsorbed ammonia.

11. The method of claim 10, wherein the sorbent regenerator operates by at least one of lowering the pressure and increasing the temperature, and the regenerated solid sorbent particles are reintroduced to the reactor.

12. The method of claim 1, wherein overall conversion of nitrogen and hydrogen to ammonia ranges from 70% to 95%.

13. A system for producing ammonia according to the method of claim 1, the system comprising:
- a fluidized bed reactor configured to receive a flow of solid sorbent particles, nitrogen gas, and hydrogen gas, the fluidized bed reactor including a fluidized bed of catalyst particles, wherein the nitrogen gas and hydrogen gas react on a surface of the catalyst particles generating ammonia, and wherein at least a portion of the generated ammonia is adsorbed by the sorbent particles;
- at least one of a cyclone or a filter to separate the solid sorbent particles from an unreacted nitrogen gas, an unreacted hydrogen gas and an unadsorbed ammonia; and
- a sorbent regenerator to release an adsorbed ammonia from the solid sorbent particles.

14. The method of claim 1, further comprising:
- providing a continuous flow of the stream of the solid sorbent particles, nitrogen gas, and hydrogen gas into a fluidized bed reactor, wherein the fluidized bed reactor includes the fluidized bed of catalyst particles;
- reacting the nitrogen gas and the hydrogen gas in the presence of the catalyst particles in the fluidized bed reactor to form the ammonia;
- elutriating an adsorbed ammonia out of the fluidized bed reactor along with unreacted nitrogen gas, unreacted hydrogen gas, and unabsorbed ammonia;
- separating the solid sorbent particles from the unreacted nitrogen gas, the unreacted hydrogen, and the unabsorbed ammonia;
- releasing the adsorbed ammonia from the solid sorbent particles to produce a pure ammonia product; and
- reintroducing regenerated sorbent particles into the reactor.

15. The method of claim 14, further comprising recycling the unreacted nitrogen gas, the unreacted hydrogen, and unabsorbed ammonia to the reactor.

16. The method of claim 14, wherein the catalyst particles comprise a mean diameter ranging from 1.0 mm to 6.0 mm and the solid sorbent particles comprise a mean diameter ranging from 0.01 mm to 0.6 mm.

17. The method of claim 14, wherein the fluidized bed reactor is maintained at a temperature of 350° C. and a pressure of the fluidized bed reactor is maintained in a range of 900 psig to 1,100 psig.

18. The method of claim 14, wherein the fluidized bed reactor comprises a cylindrical shape with a height to diameter ratio of at least ten to one.

19. The method of claim 14, wherein an overall conversion of the nitrogen gas and the hydrogen gas to ammonia is greater than 70%.

20. The method of claim 1, wherein a fluidized bed reactor is configured to receive a flow of the solid sorbent particles, nitrogen gas, and hydrogen gas, the fluidized bed reactor including the fluidized bed of catalyst particles, and further comprising:
- at least one of a cyclone or a filter separating the solid sorbent particles from an unreacted nitrogen gas, an unreacted hydrogen gas and an unadsorbed ammonia; and
- a sorbent regenerator releasing an adsorbed ammonia from the solid sorbent particles.

21. The method of claim 20, further including a recycle line recycling the unreacted nitrogen gas, the unreacted hydrogen gas, and the unabsorbed ammonia to the reactor.

22. The method of claim 20, wherein the method operates with a continuous flow of the solid sorbent particles, the nitrogen gas, and the hydrogen gas.

23. The method of claim 20, further comprising at least one of a temperature control system controlling a temperature of the fluidized bed reactor or a pressure control system controlling a pressure of the fluidized bed reactor.

24. The method of claim 20, wherein the fluidized bed reactor operates at a pressure ranging from 300 psig to 4,000 psig and a temperature ranging from 200° C. to 500° C.

25. The method of claim 20, wherein the fluidized bed reactor operates at a pressure of about 1,000 psig and a temperature of about 350° C.

26. The method of claim 20, wherein the fluidized bed reactor comprises a cylindrical shape with a height to diameter ratio ranging from 10:1 to 20:1.

27. The method of claim 26, wherein the fluidized bed reactor includes a tapered section.

* * * * *